April 26, 1949.  W. G. NEILD  2,468,228
ELECTRICAL REGULATOR
Filed April 23, 1945
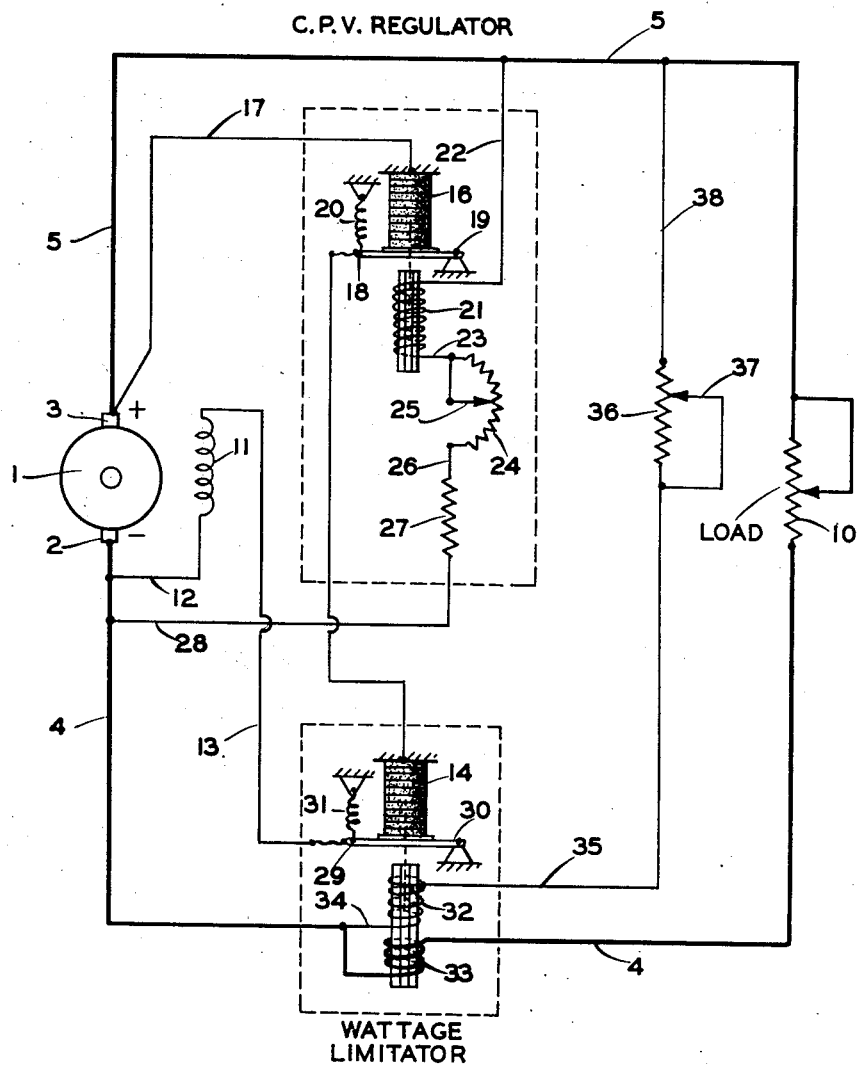
INVENTOR.
WILLIAM G. NEILD
BY Herbert L. Davis, Jr.
ATTORNEY Patented Apr. 26, 1949

2,468,228

UNITED STATES PATENT OFFICE 2,468,228

ELECTRICAL REGULATOR

William Greene Neild, Warren Point, N. J., assignor to Bendix Aviation Corporation, Teterboro, N. J., a corporation of Delaware Application April 23, 1945, Serial No. 589,777

1 Claim. (Cl. 322—24)

The present application relates to electrical regulators and more particularly to a novel electrical system including a carbon pile regulator as a wattage limiter.

An object of the invention is to provide a regulator system arranged to limit the output of the generator so as to prevent overloading of the driving engine.

Another object of the invention is to provide novel output limiting means for an engine driven generator, particularly applicable where overloading of the engine may cause the same to stall.

Another object of the invention is to provide an output limiter for a generator in which a pair of carbon pile regulators are connected in series with the field of the generator and an arrangement in which one of said carbon pile regulators has a solenoid connected across the output of the generator so as to maintain a substantially constant voltage within predetermined limits and other of the carbon pile regulators having a pair of control coils one connected across the output of the generator and the other connected in series with the load and arranged so as to prevent the generator from generating an excessive amperage so that upon an excessive amperage being generated the voltage is decreased by the last mentioned regulator so as to limit the output to within a safe predetermined wattage range.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claim for this purpose.

The drawing is a diagrammatic view illustrating an electrical system embodying one form of my invention.

In the form of the invention shown in the drawing there is provided a direct current generator of conventional type and indicated generally by the numeral 1.

The generator 1 has an armature winding, not shown, but which may be of conventional type. Connections from the armature winding lead to a suitable commutator having brushes 2 and 3 and output lines 4 and 5 leading from the brushes to a variable load indicated generally by the numeral 10. The armature is driven by a suitable engine, not shown, but which preferably is of the small engine-generator type well known in the art.

The generator 1 has a suitable field winding 11 having one end thereof connected by a conductor 12 to the output line 4.

The opposite end of the field winding 11 is connected by a conductor 13 to one end of a variable resistance carbon pile element 14. The opposite end of the carbon pile 14 is connected through a conductor 15 to a second variable resistance carbon pile element 16. The opposite end of the carbon pile element 16 is connected through a conductor 17 to the output line 5. Thus the carbon pile elements 14 and 16 control the energization of the field winding 11 which in turn controls the output of the generator 1 in a manner well known in the art.

The carbon pile element 16 forms one element of a carbon pile regulator shown diagrammatically in the drawing as including an armature 18 pivoted at 19 and exerting a compressive force upon the carbon pile element 16 under tension of a spring 20. The position of the armature 18 is controlled by an electromagnet 21 having a core and exerting an electromagnetic force acting in opposition to the spring 20. The spring 20 is arranged so as to balance the pull of the armature 18 by the electromagnet 21 when the electromagnet 21 is energized by a voltage having a predetermined value. The regulator is preferably of a type such as shown in the copending patent application Serial No. 570,002 of William G. Neild, filed December 27, 1944, now Patent 2,427,805, issued September 23, 1947.

One end of the electromagnetic winding 21 is connected through a conductor 22 to the output line 5. The opposite end of the electromagnetic winding 21 is connected through a conductor 23 to one end of a variable resistor 24.

The variable resistor 24 has an adjustable arm 25 and has its opposite end connected through an electrical conductor 26 to a fixed resistor 27 which is connected through a conductor 28 to the output line 4.

Thus it will be seen that the electromagnet 21 will be energized in response to the output voltage across the lines 4 and 5. Moreover, a change in such voltage will cause an adjustment of the carbon pile element 16 to maintain a substantially constant output voltage in the lines 4 and 5.

Through adjustment of the variable resistor 24 through arm 25 the predetermined voltage may be suitably adjusted.

In such a system due to change in the load, the regulated voltage may be maintained constant while the amperage may increase to a value causing an overload on the driving means, which in the case of small engines, may cause the same to stall.

In order to avoid the latter difficulty, there is provided the carbon pile resistor or element 14 which limits the output of the generator 1 upon the amperage exceeding a predetermined value.

The latter carbon pile element 14 forms one element of a carbon pile regulator shown diagrammatically in the drawing as including an armature 29 pivoted at 30 and exterting a compressive force upon the carbon pile element 14 under tension of a spring 31. The position of the armature 29 is controlled by a pair of electromagnetic windings or coils 32 and 33. These coils 32 and 33 are wound upon a common core and one may be wound about the other.

The regulator is preferably of a type such as shown in the copending patent application Serial No. 570,002 of William G. Neild, filed December 27, 1944, in which the armature spring is arranged so as to balance the electromagnetic force exerted upon the armature, on such force being regulated to a value indicative of a predetermined condition of the electromagnet.

The coil 32 is a shunt coil of a large number of turns and is connected across the output lines 4 and 5 of the generator. One end of the coil 32 is connected by a conductor 34 to the conductor or output line 4, while the other end of the coil 32 is connected by a conductor 35 to a variable resistor 36 having an adjustable arm 37. The opposite end of the variable resistor 36 is connected by a conductor 38 to the output line 5. The resistor 36 provides a convenient means for initially adjusting the regulator coil 32.

The other coil 33 is a series coil connected in the line 4 in series with the load 10 and is formed of a comparatively few number of turns, wound preferably about the shunt coil 32.

The shunt coil 32 is made of fine wire while the series coil 33 is preferably formed of a wire having a relatively large cross sectional area so as to offer very low resistance to the passage of the line current through it.

The purpose of the coils 32 and 33 is to so regulate the carbon pile element 14 that the generator 1 is prevented from developing a wattage output in excess of a predetermined value.

Thus, for example, upon the generator 1 developing a voltage slightly in excess of 28 volts, the voltage will remain constant up to a predetermined amperage of, for example 75 amperes. The voltage is maintained at this predetermined value through operation of the carbon pile element 16 by the voltage responsive coil 21. During the latter operation, the armature 29 controlling the resistance of the carbon pile element 14 is biased under force of the spring 31 to a full resistance decreased position and the resistance of the carbon pile element 14 is not effected by the voltage and current flow in the coils 32 and 33 up to the predetermined wattage limit.

However, if the generator 1 tends to generate a greater amperage than the predetermined limit of say 75 amperes, then the combined electromagnetic forces in the voltage responsive winding 32 and current responsive winding 33 tend to adjust the armature 30 towards the electromagnetic winding in a resistance increasing direction until the resulting decreased voltage and prevailing amperage effects the windings 32 an 33 so as to exert a predetermined electromotive force balancing the spring 31 at the adjusted position of the armature 29. During the latter operation the voltage effecting the winding 21 which controls the carbon pile element 16 drops below the voltage required for balancing the spring 20 so that the armature 18 under force of the spring 20 adjusts the carbon pile element 16 so as to decrease the resistance of the carbon pile element 16 to normally raise the voltage to the predetermined value. In the latter operation of decreasing the resistance of the carbon pile element 16, the voltage effecting the winding 32 will be likewise increased, effecting in turn the carbon pile element 14 and ultimately causing the carbon pile element 16 to be adjusted to a full resistance decreased condition, whereupon the armature 29 under control of the windings 32 and 33 will be further adjusted so as to increase the resistance of the carbon pile element 14 sufficiently to compensate for the decrease in the resistance of carbon pile element 16 and reduce the voltage acting through the winding 32 to a balanced condition at which the total amperage turns of the windings 32 and 33 equals a predetermined value at which the spring 31 is balanced by the electromotive force.

Thus, so long as the generator 1 generates an amperage in excess of the predetermined limit, the shunt winding 32 and series winding 33 adjust the carbon pile element 14 so as to tend to limit the voltage to that at which the total electromagnetic force exerted by the voltage through the winding 32 and the current through the winding 33 balances the force of the spring 31.

Upon the electromagnetic force exerted through these windings varying from the balanced condition, the carbon pile element 14 is adjusted so as to bring the same back into balanced condition so as to prevent a wattage in excess of a predetermined value.

However, upon the amperage and accordingly the wattage dropping below a predetermined minimum condition then the spring 31 tends to adjust the armature 29 in a direction decreasing the resistance of the carbon pile element 14 to its minimum value, whereupon the voltage generated by the generator 1 will then normally exceed the predetermined maximum voltage value, whereupon the winding 21 will adjust the armature 18 so as to increase the resistance of the carbon pile element 16 so as to once again bring the carbon pile element 16 into operation so as to regulate the voltage and thereby maintain a predetermined constant voltage until such time as the amperage once again exceeds the predetermined limit whereupon the carbon pile element 16 will discontinue operation and the carbon pile element 14 will be brought into operation as previously explained.

From the foregoing it will be seen that there is provided a novel regulator means for a generator whereby the voltage produced may be maintained at a constant value within a limited amperage range and including means so arranged that if the generator 1 should generate a voltage at an amperage beyond a predetermined value then the voltage will be further regulated so as to tend to limit the wattage to within a predetermined range.

Moreover, under conditions where the generator 1 is driven at a substantially constant speed, the armature spring 31 may be so calibrated and arranged that for each adjusted position of the armature 29 the spring 31 may be balanced by an electromotive force effected under a current and voltage condition indicative of at least an approximately constant regulated wattage. The latter arrangement will be readily apparent from the disclosure of my copending application Serial No. 570,002, filed December 27, 1944.

Thus by appropriate arrangement of the spring 31 the regulator may be arranged to effect either a constant NI or amperage turn condition in the control electromagnet or the same may be arranged so as to regulate the generator 1 so as to produce a predetermined constant wattage either within the limited excess amperage range or throughout the entire operating range of the generator as may be desired. In the latter case, the voltage regulator 16 may of course be eliminated.

The regulator thus described is particularly applicable for use with small generator sets where it is important not to overload the driving engine of the generator and thereby provides means for preventing stalling of the engine through an overload. Thus there is provided novel means whereby the maximum output of the driving engine may be limited by limiting the output of the generator.

Although only one embodiment of the invention has been illustrated and described, various changes in the form and relative arrangements of the parts, which will now appear to those skilled in the art, may be made without departing from the scope of the invention. Reference is therefore, to be had to the appended claim for a definition of the limits of the invention.

What is claimed is:

A regulating system for a generator, comprising in combination, a field winding for controlling a condition of the output of said generator, a first variable resistance element, a second variable resistance element, a circuit electrically connecting said first and second variable resistance elements and said field winding in series across the output of said generator, first spring means normally maintaining said first variable resistance element at a minimum resistance upon said generator producing a wattage less than a predetermined value, regulating means for varying the resistance of said first variable resistance element, first and second electromagnetic windings acting accumulatively for controlling the regulating means for said first variable resistance element, said first winding connected across the output of the generator and the second winding connected in series with a load of said generator, said first and second electromagnetic windings being arranged in such a manner as to accumulatively oppose said first spring means to affect the regulating means to vary the excitation of the field winding, said spring means being so arranged as to cooperate with said first and second electromagnetic windings in effecting a substantially constant regulated wattage output from said generator upon said generator producing a wattage in excess of a predetermined value, a second spring means maintaining said second variable resistance element at a minimum resistance upon said generator producing a voltage less than a predetermined value, second regulating means for varying the resistance of said second variable resistance element, a third electromagnetic winding connected across the output of the generator and effective for controlling said second regulating means upon said generator producing a wattage less than a predetermined value and a voltage in excess of said last mentioned predetermined voltage value.

WILLIAM GREENE NEILD.

REFERENCES CITED

The following references are of record in the file of this patent:

UNITED STATES PATENTS

| Number | Name | Date |
| --- | --- | --- |
| 1,113,199 | Creveling | Oct. 13, 1914 |
| 1,179,373 | Jepson | Apr. 11, 1916 |